(12) United States Patent
Tsujiuchi et al.

(10) Patent No.: US 8,961,665 B2
(45) Date of Patent: Feb. 24, 2015

(54) EXHAUST GAS TREATMENT SYSTEM

(75) Inventors: Tatsuya Tsujiuchi, New York, NY (US); Shintaro Honjo, New York, NY (US); Takahito Yonekawa, New York, NY (US); Satoru Sugita, New York, NY (US); Motofumi Ito, New York, NY (US); Takashi Kamijo, Tokyo (JP); Tatsuto Nagayasu, Tokyo (JP); Takuya Okamoto, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 334 days.

(21) Appl. No.: 13/604,136

(22) Filed: Sep. 5, 2012

(65) Prior Publication Data

US 2013/0255502 A1    Oct. 3, 2013

Related U.S. Application Data

(60) Provisional application No. 61/616,677, filed on Mar. 28, 2012.

(51) Int. Cl.
*B01D 53/14*    (2006.01)

(52) U.S. Cl.
USPC .................. 96/242; 95/183; 95/193; 95/194; 95/227; 95/228; 95/199; 95/236; 95/209

(58) Field of Classification Search
None
See application file for complete search history.

(56) References Cited

U.S. PATENT DOCUMENTS

2011/0020203 A1    1/2011   Eksilioglu et al.

FOREIGN PATENT DOCUMENTS

| EP | 1 759 756 A1 | 3/2007 |
|----|--------------|--------|
| EP | 2 269 712 A1 | 1/2011 |
| JP | 2011-240321 A | 12/2011 |
| JP | 2012-37180 A | 2/2012 |

OTHER PUBLICATIONS

Communication under Rule 71(3) EPC (invitation to pay the fee for grant, etc.) dated Feb. 19, 2014, issued in corresponding European application No. 13160546.1 (7 pages).
Decision to Grant a European Patent Pursuant to Article 97(1) EPC dated Jul. 10, 2014, issued in corresponding European Patent Application No. 13160546.1 (2 pages).
Australian Notice of Allowance dated Sep. 25, 2014, issued in corresponding Australian Patent application No. 2013201825 (3 pages).
Canadian Notice of Allowance dated Oct. 6, 2014, issued in corresponding Canadian Patent application No. 2810138 (1 page).

*Primary Examiner* — Duane Smith
*Assistant Examiner* — Phillip Shao
(74) *Attorney, Agent, or Firm* — Westerman, Hattori, Daniels & Adrian, LLP

(57) ABSTRACT

There is provided an exhaust gas treatment system including a $CO_2$ recovery unit with further enhanced energy efficiency. The exhaust gas treatment system (1) includes: a $CO_2$ recovery unit (10) including a $CO_2$ absorption column (11), an absorbing solution regeneration column (16), a condensate supply pipeline (15) for supplying condensate, which contains $CO_2$ absorbing solution discharged from the $CO_2$ absorption column (11) to a bottom portion of the absorbing solution regeneration column (16), and a $CO_2$ separation section (22) for performing heat exchange, via a heat exchanger (23), between the $CO_2$ discharged from the absorbing solution regeneration column (16) and the condensate; and an exhaust gas heat exchanger (5) provided on a gas upstream side of the $CO_2$ recovery unit (10) for performing heat exchange between exhaust gas before flowing into the $CO_2$ recovery unit (10) and the condensate.

3 Claims, 4 Drawing Sheets

EXHAUST GAS TREATMENT SYSTEM

TECHNICAL FIELD

The present invention relates to an exhaust gas treatment system having a carbon dioxide ($CO_2$) recovery unit placed for removing $CO_2$ from exhaust gas.

BACKGROUND ART

In thermal power systems for generating power by combusting fossil fuels such as coal and heavy fuel, a large amount of $CO_2$ is discharged. In recent years, the greenhouse effect by $CO_2$ is pointed out as one of the causes of the global warming. It is necessary, therefore, to take prompt measures to protect the global environment on an international basis. Under these circumstances, there is a trend toward further increase in demand for $CO_2$ discharge control.

In the thermal power systems, there is installed an exhaust gas treatment system including a $CO_2$ recovery unit placed in a flow passage on the downstream side of a boiler. The $CO_2$ recovery unit includes a $CO_2$ absorption column and a $CO_2$ regeneration column as described in Patent Literature 1 and Patent Literature 2. In the $CO_2$ absorption column, combustion exhaust gas from the boiler is brought into contact with an amine $CO_2$ absorbing solution to remove $CO_2$ in the combustion exhaust gas. The absorbing solution which absorbed $CO_2$ is conveyed to the regeneration column. In the regeneration column, the absorbing solution which absorbed $CO_2$ is heated and $CO_2$ is released from the absorbing solution. As a result, the absorbing solution is regenerated. The absorbing solution regenerated in the regeneration column is circulated to the $CO_2$ absorption column and is reused therein. The $CO_2$ recovered from the combustion exhaust gas by the $CO_2$ recovery unit is stored without being released to the air or is used for Enhanced Oil Recovery (EOR) and the like.

Since the $CO_2$ recovery unit is placed as an additional structure of a combustion facility, it is also necessary to minimize its operating cost. In the step of regenerating the absorbing solution in particular, a large amount of thermal energy is consumed. Therefore, the regenerating process needs to be energy-saving as much as possible.

In the exhaust gas treatment system in Patent Literature 1, a part of an absorbing solution which was extracted through a bottom portion of the $CO_2$ absorption column and supplied to the $CO_2$ regeneration column is preheated through heat exchange with vapor of a reboiler of the $CO_2$ regeneration column, before heat exchange is performed between the absorbing solution and a regenerated absorbing solution which was extracted through a bottom portion of the regeneration column and supplied to the $CO_2$ absorption column. With such a structure, sensible heat of the absorbing solution in the regeneration column increases, so that the vapor amount fed to a $CO_2$ removal facility is reduced.

In the thermal power system in Patent Literature 2, the amount of heat recovered by cooling the exhaust gas discharged from the boiler is used to heat an absorbing solution which absorbed $CO_2$ and which is supplied from the $CO_2$ absorption column to the regeneration column. Moreover, condensate from a condenser which returns water vapor sent from a turbine to water is used to cool washing water for use in collection of the absorbing solution in the $CO_2$ absorption column, while the condensate is also used to cool $CO_2$ separated in the regeneration column.

CITATION LIST

Patent Literature

{PTL 1}
Japanese patent application publication No. 2011-240321 A
{PTL 2}
Japanese patent application publication No. 2012-37180 A

SUMMARY OF INVENTION

Technical Problem

An object of the present invention is to provide an exhaust gas treatment system including a $CO_2$ recovery unit which considerably reduces a water vapor generation amount and enhances energy efficiency in the system.

Solution to Problem

One aspect of the present invention is an exhaust gas treatment system provided on a downstream side of a boiler which combusts fuel to heat water and generate water vapor, including: a $CO_2$ recovery unit including a $CO_2$ absorption column for bringing gas containing $CO_2$ generated in the boiler into contact with a $CO_2$ absorbing solution so that the $CO_2$ absorbing solution absorbs the $CO_2$ and thereby the $CO_2$ is removed out of the gas, an absorbing solution regeneration column for separating the $CO_2$ from the $CO_2$ absorbing solution which absorbed the $CO_2$ to regenerate the $CO_2$ absorbing solution, a condensate supply pipeline for supplying condensate, which contains the $CO_2$ absorbing solution discharged from the $CO_2$ absorption column, to a bottom portion of the absorbing solution regeneration column, and a $CO_2$ separation section placed on a gas downstream side of the absorbing solution regeneration column for performing heat exchange, via a first heat exchanger, between the condensate which circulates in the condensate supply pipeline and a mixture of water vapor and $CO_2$ discharged from the absorbing solution regeneration column so that the $CO_2$ and the water vapor are cooled and separated; and an exhaust gas heat exchanger provided on a gas upstream side of the $CO_2$ recovery unit for performing heat exchange between the gas before flowing into the $CO_2$ recovery unit and the condensate so that the condensate is heated while the gas is cooled.

In the aforementioned exhaust gas treatment system, the condensate, which contains the $CO_2$ absorbing solution condensed in a washing section positioned in an upper portion in the $CO_2$ absorption column, is discharged from the $CO_2$ absorption column. The discharged condensate exchanges heat with $CO_2$ discharged from the absorbing solution regeneration column. The discharged condensate is then heated in the exhaust gas heat exchanger through heat exchange with an exhaust gas flowing on the upstream side of the $CO_2$ recovery unit. The heated condensate is conveyed to the absorbing solution regeneration column. In this process, $CO_2$ separated from the exhaust gas and the exhaust gas before $CO_2$ recovery are cooled. Thus, the heat recovered from exhaust gas can be used for $CO_2$ removal process, which enhances thermal efficiency in an exhaust gas treatment apparatus and leads to enhanced performance of the exhaust gas treatment system.

It is preferable that the exhaust gas treatment system includes a boiler feed water pipeline for circulating boiler feed water to the boiler and that the exhaust gas heat exchanger performs heat exchange between the boiler feed water which circulates in the boiler feed water pipeline and the gas so that the boiler feed water is heated.

Thus, using the exhaust gas for heating the boiler feed water makes it possible to further enhance the thermal efficiency in the boiler.

In this case, it is preferable that the $CO_2$ separation section further includes a second heat exchanger for performing heat exchange between the boiler feed water and the $CO_2$ discharged from the absorbing solution regeneration column, so that the water vapor which circulates in the boiler feed water pipeline is heated.

The above structure makes it possible to heat the boiler feed water and the $CO_2$ absorbing solution up to respective predetermined temperatures and to respectively convey the water to the boiler and the absorbing solution regeneration column.

Advantageous Effects of Invention

According to the present invention, the heat recovered from exhaust gas is used for $CO_2$ removal process. This makes it possible to enhance the thermal efficiency in the exhaust gas treatment apparatus. Using the heat recovered from exhaust gas for heating the boiler feed water makes it also possible to enhance the thermal efficiency of the boiler. As a result, performance of the boiler and the exhaust gas treatment system can be enhanced.

DESCRIPTION OF EMBODIMENTS

First Embodiment

Figure 1:
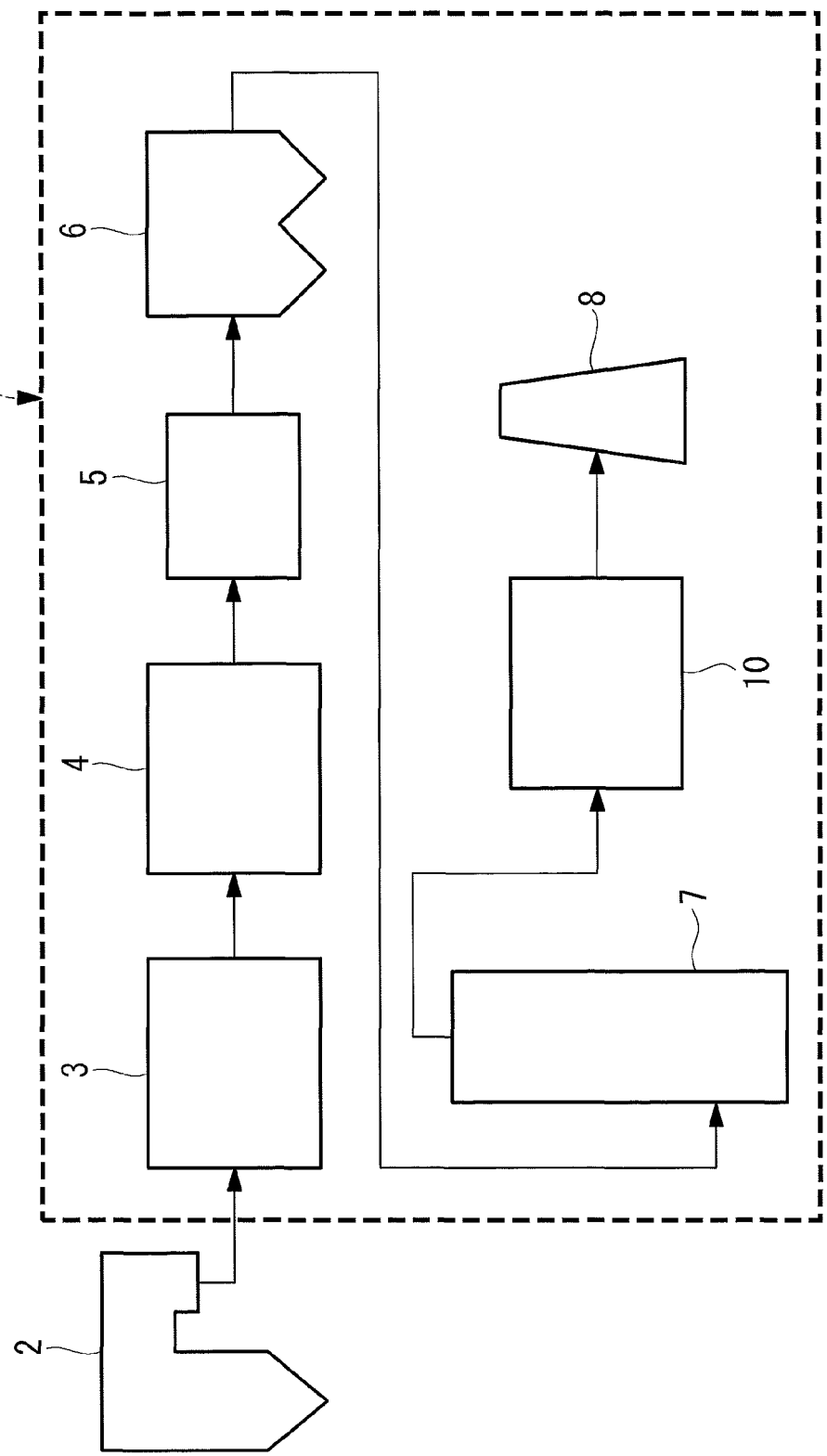
FIG. 1 is a schematic view of an exhaust gas treatment system.

FIG. 1 is a schematic view of an exhaust gas treatment system. The exhaust gas treatment system 1 is placed on a gas downstream side of a combustion facility such as a boiler 2. Arrows in the drawing indicate the flow of exhaust gas generated in the boiler 2. The exhaust gas treatment system 1 includes, in order from the gas upstream side, a NOx removal unit 3, an air heater 4, a dry electrostatic precipitator 6, a wet desulfurization unit 7, a $CO_2$ recovery unit 10, and a smokestack 8. In the exhaust gas treatment system 1 of the first embodiment, an exhaust gas heat exchanger 5 is placed between the air heater 4 and the dry electrostatic precipitator 6. The exhaust gas heat exchanger 5 may be placed between the dry electrostatic precipitator 6 and the wet desulfurization unit 7.

Figure 2:
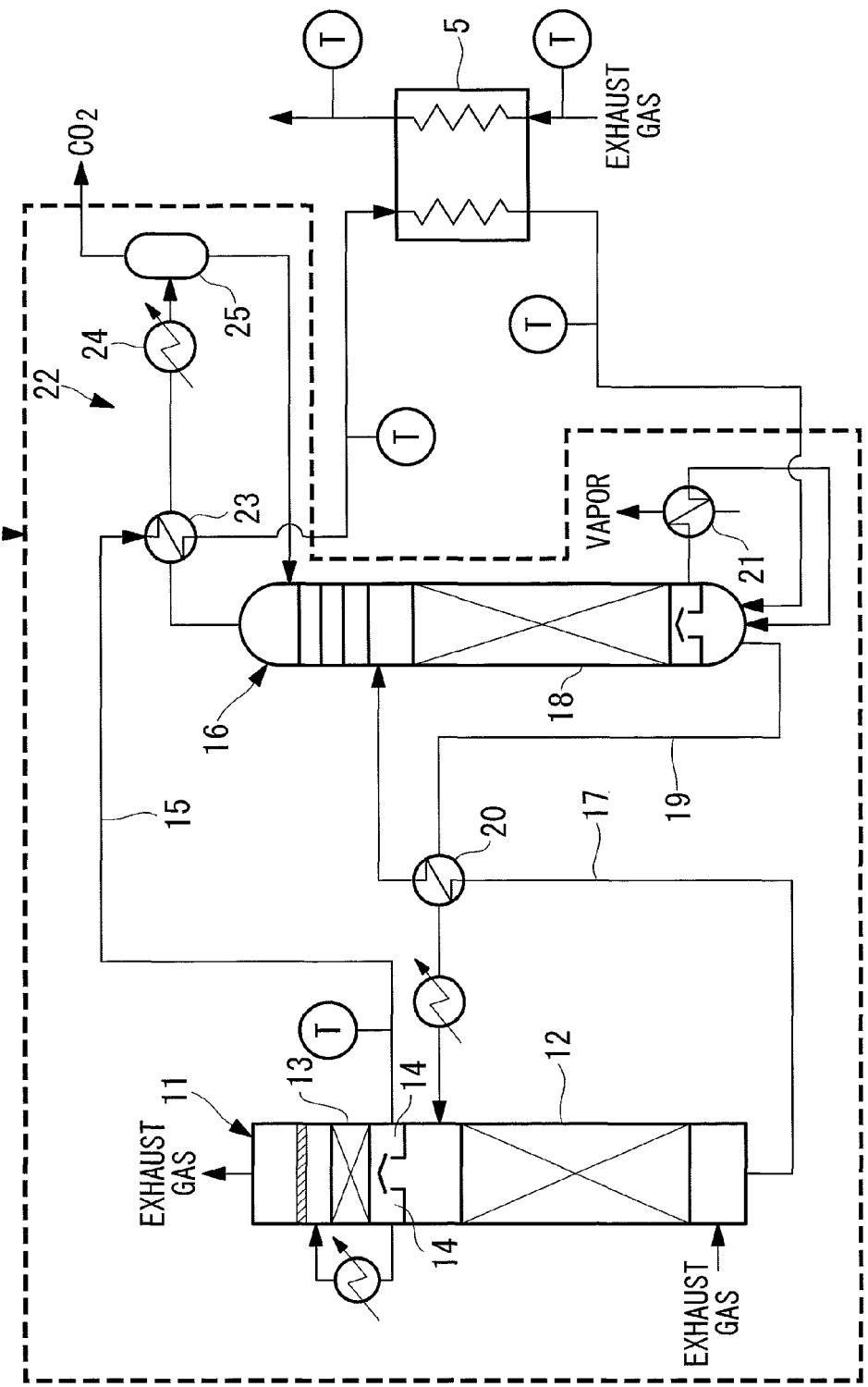
FIG. 2 is a schematic view for explaining a $CO_2$ recovery unit in an exhaust gas treatment system according to a first embodiment.

FIG. 2 is a schematic view for explaining the $CO_2$ recovery unit in the exhaust gas treatment system according to the first embodiment. The $CO_2$ recovery unit 10 in the first embodiment includes a $CO_2$ absorption column 11, an absorbing solution regeneration column 16, a reboiler 21, and a $CO_2$ separation section 22. Placed on the gas upstream side of the $CO_2$ absorption column 11 is an exhaust gas cooling unit (unshown), which cools the exhaust gas discharged from the combustion facility with cooling water.

The cooled exhaust gas containing $CO_2$ is supplied into the $CO_2$ absorption column 11 through a lower portion of the $CO_2$ absorption column 11. The $CO_2$ absorption column 11 is composed of a $CO_2$ recovery section 12 and a water washing section 13 in order from the gas upstream side.

In the $CO_2$ recovery section 12, a $CO_2$ absorbing solution is sprayed into the exhaust gas. The $CO_2$ absorbing solution has, for example, an amine solution as a base. Consequently, the exhaust gas and the $CO_2$ absorbing solution come into counter-current contact, and $CO_2$ in the exhaust gas is absorbed by the $CO_2$ absorbing solution due to a chemical reaction.

The exhaust gas with $CO_2$ removed is conveyed to the water washing section 13. Circulating cleaning water is sprayed into the exhaust gas from the upside of the water washing section 13. Accordingly, the exhaust gas and the circulating cleaning water come into gas-liquid contact, so that moisture contained in the exhaust gas is condensed and the condensed moisture is collected. The exhaust gas with $CO_2$ and $CO_2$ absorbing solution removed is discharged to the outside of the system (the smokestack 8 of FIG. 1) through an upper portion of the $CO_2$ absorption column 11.

The moisture in the exhaust gas condensed in the water washing section 13 and the circulating cleaning water are collected in a tray 14 placed under the water washing section 13. A part of the collected liquid is sprayed in the water washing section 13 as circulating cleaning water. Another part of the collected liquid is discharged from the $CO_2$ absorption column 11 as condensate and is supplied to a bottom portion of the absorbing solution regeneration column 16 through a condensate supply pipeline 15.

The $CO_2$ absorbing solution (rich solution) which absorbed $CO_2$ in the $CO_2$ recovery section 12 is stored in the lower portion of the $CO_2$ absorption column 11. The rich solution is discharged from the $CO_2$ absorption column 11 by a pump (unshown) and is supplied to an upper portion of the absorbing solution regeneration column 16 through a rich solution supply line 17.

A regenerating section 18 is provided in the inside of the absorbing solution regeneration column 16. Two or more regenerating sections 18 may be provided. The rich solution is sprayed to the inside of the absorbing solution regeneration column 16 from the upper portion of the regenerating section 18. Vapor is fed into the absorbing solution regeneration column 16 from the lower side of the regenerating section 18. In the regenerating section 18, the rich solution and the vapor come into gas-liquid contact, and a major part of $CO_2$ is released from the rich solution due to an endothermic reaction. By the time the $CO_2$ absorbing solution (semi-lean solution) with a part or a major part of $CO_2$ released therefrom reaches the bottom portion of the absorbing solution regeneration column 16, it is regenerated as a $CO_2$ absorbing solution (lean solution) with almost all $CO_2$ removed therefrom.

The $CO_2$ absorbing solution (lean solution and condensate) is stored in the bottom portion of the absorbing solution regeneration column 16. A part of the $CO_2$ absorbing solution stored in the bottom portion of the absorbing solution regeneration column 16 is conveyed to an upper portion of the recovery section 12 in the $CO_2$ absorption column 11 through a lean solution supply line 19 by a pump (unshown), and is sprayed into the exhaust gas in the inside of the $CO_2$ absorption column 11. A rich/lean solution heat exchanger 20 is placed in the rich solution supply line 17 and the lean solution supply line 19. In the rich/lean solution heat exchanger 20, heat exchange between the rich solution and the lean solution is performed, so that the rich solution is heated while the lean solution is cooled.

A part of the $CO_2$ absorbing solution stored in the bottom portion of the absorbing solution regeneration column 16 is supplied to the reboiler 21. In a regenerative heater (unshown) of the reboiler 21, the solution is heated into vapor by water vapor, and the vapor is supplied to the absorbing solution regeneration column 16.

The $CO_2$ separated from the $CO_2$ absorbing solution in the regenerating section of the absorbing solution regeneration column 16 is discharged from a top portion of the absorbing solution regeneration column 16 together with the water vapor released from the rich solution and the semi-lean solution, and is conveyed to the $CO_2$ separation section 22.

The $CO_2$ separation section 22 includes a heat exchanger 23, a condenser 24, and a separation drum 25. As a mixture of water vapor and $CO_2$ is discharged from the absorbing solution regeneration column 16, the water vapor is condensed in the condenser 24, and water is separated in the separation drum 25. The $CO_2$ separated from water is released to the outside of the system. The released $CO_2$ is compressed by a compressor (unshown) and is recovered.

The water separated from $CO_2$ by the separation drum 25 is fed to the upper portion of the absorbing solution regeneration column 16 by a pump (unshown).

In the present embodiment, the condensate in the $CO_2$ absorption column 11 is conveyed to the absorbing solution regeneration column 16 via the heat exchanger 23 of the $CO_2$ separation section 22 and the exhaust gas heat exchanger 5.

In the heat exchanger 23 in the $CO_2$ separation section 22, the condensate discharged from the $CO_2$ absorption column 11 exchanges heat with the $CO_2$ accompanying water vapor discharged from the absorbing solution regeneration column 16. As a consequence, the $CO_2$ absorbing solution is heated. In the exhaust gas treatment system of the present embodiment, the condensate in the $CO_2$ absorption column 11 is managed in the temperature range from about 40 to 60° C. The condensate discharged from the $CO_2$ absorption column at the above temperature range is heated to 70 to 90° C. in the heat exchanger 23 of the $CO_2$ separation section 22.

The $CO_2$ accompanying water vapor is cooled by the heat exchange and is conveyed to the condenser 24 on the gas downstream side. In short, $CO_2$ is gradually cooled by the heat exchanger 23 and the condenser 24. With such a structure, the amount of cooling water fed to the condenser 24 can be decreased.

The condensate heated by the heat exchanger 23 is supplied to the exhaust gas heat exchanger 5 and exchanges heat with the exhaust gas discharged from the boiler 2 and before flowing into the dry electrostatic precipitator 6. As a consequence, the condensate is further heated while the exhaust gas is cooled. In the exhaust gas treatment system 1 of the present embodiment, the exhaust gas discharged from the boiler 2 is cooled to about 130 to 200° C. by passing through the air heater 4, and the cooled exhaust gas flows into the exhaust gas heat exchanger 5. The exhaust gas is then cooled to 80 to 120° C. by the heat exchange performed in the exhaust gas heat exchanger 5. In contrast, the condensate is further heated to 120 to 160° C., and flows into the absorbing solution regeneration column 16.

The temperature rise width of the condensate by the heat exchanger 23 is controlled with the flow rate of the condensate or the flow rate of $CO_2$ gas containing water vapor to be fed to the heat exchanger 23. The temperature rise width of the condensate and the temperature drop width of the exhaust gas by the exhaust gas heat exchanger 5 are controlled with the flow rate of the condensate.

When the exhaust gas heat exchanger 5 is placed on the gas upstream side of the dry electrostatic precipitator 6, the exhaust gas cooled by the aforementioned exhaust gas heat exchanger 5 is at a dew point temperature of sulfur trioxide ($SO_3$) or below. Therefore, as the exhaust gas passes through the exhaust gas heat exchanger 5, the exhaust gas is cooled and $SO_3$ therein is condensed. A condensed $SO_3$ mist adheres to dust in the exhaust gas. The dust with $SO_3$ adhering thereto is collected by the dry electrostatic precipitator 6.

The exhaust gas contains heavy metals as vapor. As the heavy metals are cooled, they condense into solids. When the exhaust gas is cooled to about 150° C. by the air heater 4, most parts of the heavy metals are condensed, but a part thereof is conveyed to the gas downstream side as vapor. As the exhaust gas is further cooled in the exhaust gas heat exchanger 5 placed on the gas downstream side of the air heater 4, almost all the heavy metals are condensed. The condensed heavy metals are mainly collected in the dry electrostatic precipitator 6.

Thus, in the exhaust gas treatment system 1 of the present embodiment, the amount of heat of the exhaust gas before flowing into the $CO_2$ recovery unit 10 is used to heat condensate in the $CO_2$ recovery unit 10, so that the thermal efficiency of the entire apparatus is enhanced. As a result, the amount of heat required for the reboiler 21 can be decreased. In the exhaust gas treatment system of the present embodiment, the temperature of the exhaust gas before flowing into the dry electrostatic precipitator 6 is lowered, so that the removal rates of $SO_3$ and heavy metals are enhanced.

Second Embodiment

Figure 3:
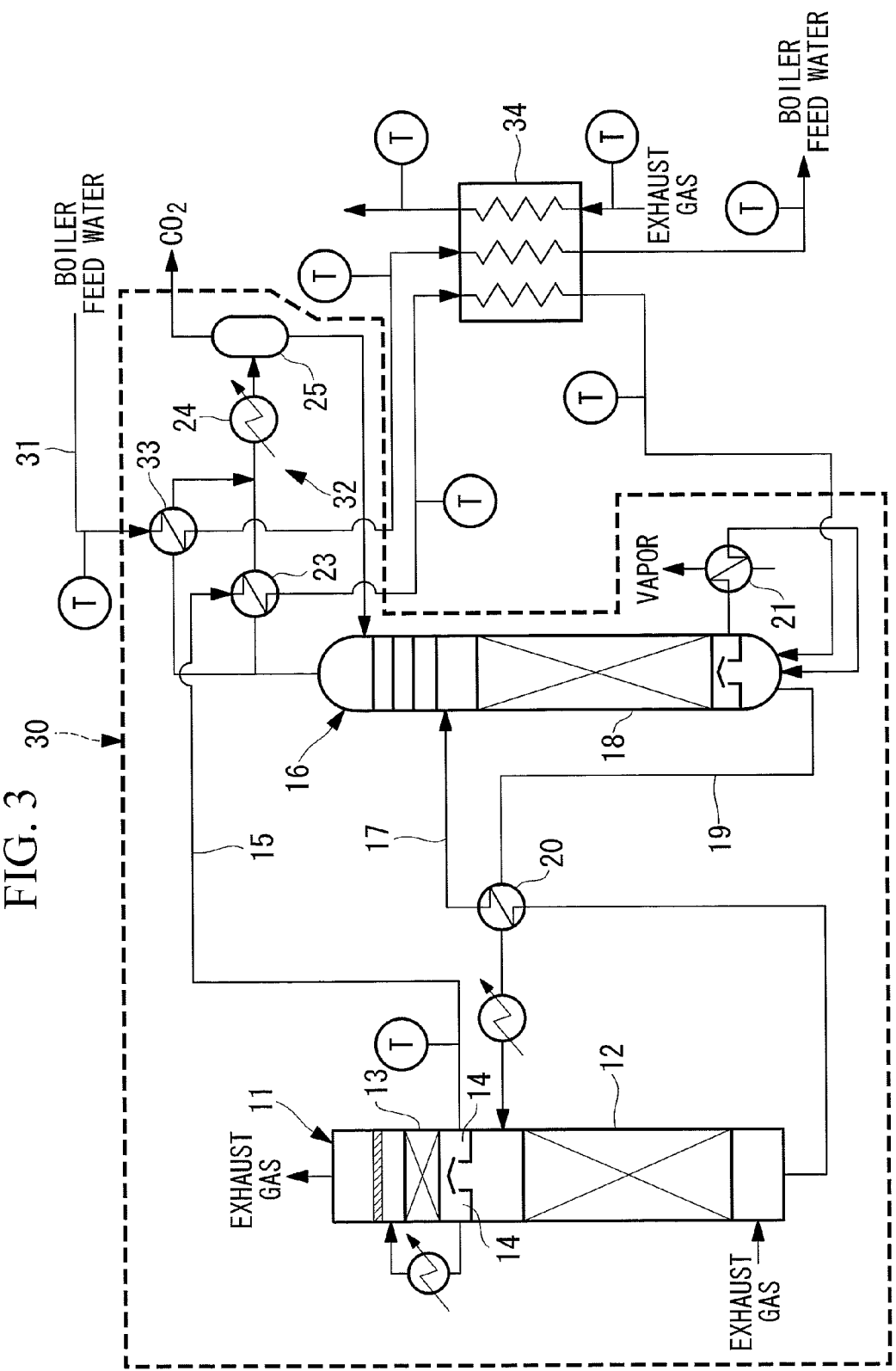
FIG. 3 is a schematic view for explaining a $CO_2$ recovery unit in an exhaust gas treatment system according to a second embodiment.

FIG. 3 is a schematic view for explaining a $CO_2$ recovery unit in an exhaust gas treatment system according to a second embodiment. In FIG. 3, structure components identical to those in FIG. 2 are designated by identical reference signs. The overall structure of the exhaust gas treatment system is identical to that of FIG. 1.

Water vapor generated in the boiler is used in a power generation facility such as a turbine and is then cooled. In the exhaust gas treatment system of the second embodiment, a boiler feed water pipeline 31 is placed so that the cooled boiler feed water circulates to the boiler via a heat exchanger 33 of a $CO_2$ separation section 32 and an exhaust gas heat exchanger 34.

In a $CO_2$ recovery unit 30 of FIG. 3, a pipeline which connects the top portion of the absorbing solution regeneration column 16 and the separation drum 25 branches to two lines. One line extends from the absorbing solution regeneration column 16 to the separation drum 25 via the heat exchanger (first heat exchanger) 23. The other line extends from the absorbing solution regeneration column 16 to the separation drum 25 via the heat exchanger (second heat exchanger) 33.

The condensate discharged from the tray 14 of the $CO_2$ absorption column 11 as in the first embodiment flows into the first heat exchanger 23 through the condensate supply pipeline 15. In the first heat exchanger 23, a part of $CO_2$ accompanying water vapor is cooled through heat exchange with the condensate. As in the first embodiment, condensate in the $CO_2$ absorption column 11 is managed in the temperature range from about 40 to 60° C., and is heated to 70 to 90° C. by the first heat exchanger 23. The temperature rise width of the condensate is adjusted with the flow rate of the condensate or the flow rate of $CO_2$ gas containing water vapor.

Boiler feed water flows into the second heat exchanger 33 through the boiler feed water pipeline 31. In the second heat exchanger 33, a part of $CO_2$ accompanying water vapor is cooled through heat exchange with the boiler feed water. The boiler feed water is heated in the second heat exchanger 33, and is supplied to the exhaust gas heat exchanger 34 through the boiler feed water pipeline 31. In the exhaust gas treatment system of the second embodiment, the boiler feed water which circulates in the upstream of the second heat exchanger 33 is managed in the temperature range from 30 to 50° C. The boiler feed water is heated to 70 to 90° C. by the second heat exchanger 33. The temperature rise width of the boiler feed water is adjusted with the flow rate of the boiler feed water or the flow rate of $CO_2$ gas containing water vapor.

The boiler feed water and the condensate which circulate in the upstream side of the heat exchangers 23 and 33 may be different in temperature as described above. The boiler feed water which passed through the heat exchanger 33 may be different in temperature from the condensate which passed through the heat exchanger 23. In such a case, two heat exchangers are provided in the $CO_2$ separation section 22 as shown in FIG. 3 so that the boiler feed water and the $CO_2$ absorbing solution can respectively be heated to predetermined temperatures.

The boiler feed water and the condensate supplied to the exhaust gas heat exchanger 34 are each heated through heat exchange with the exhaust gas from the boiler. The exhaust gas is cooled thereby and is conveyed to the gas downstream side. In the exhaust gas treatment system of the present embodiment, as in the first embodiment, the exhaust gas is cooled to about 130 to 200° C. by passing through the air heater, and the cooled exhaust gas flows into the exhaust gas heat exchanger 34. The exhaust gas is then cooled to 80 to 120° C. through heat exchange performed in the exhaust gas heat exchanger 34. In contrast, the condensate is further heated to 120 to 160° C., and flows into the absorbing solution regeneration column 16. The boiler feed water is heated to 120 to 190° C. and is circulated to the boiler. The temperature rise widths of the condensate and the boiler feed water and the temperature drop width of the exhaust gas are each properly set with the flow rate of the boiler feed water, the flow rate of the condensate and the like.

Also in the exhaust gas treatment system of the present embodiment, the exhaust gas heat exchanger 34 is placed on the gas upstream side of the dry electrostatic precipitator 5. As a consequence, the exhaust gas is cooled by the exhaust gas heat exchanger 34 to a dew point temperature of $SO_3$ or below as described before, so that the removal efficiency of $SO_3$ in the exhaust gas treatment system is enhanced. The removal rate of heavy metals is also enhanced.

EXAMPLE 1

The amount of heat required for the reboiler in the case of treating exhaust gas with use of the exhaust gas treatment system including the $CO_2$ recovery unit shown in FIG. 2 was calculated. In calculation, the temperatures of the condensate and the exhaust gas were set as shown in Table 1. The flow rate of the condensate was set at 11.2 ton/hr and the pressure of the condensate at an inlet port of the exhaust gas heat exchanger was set at 6 atm.

TABLE 1

| | Condensate temperature (° C.) | | Exhaust gas temperature (° C.) | | |
| --- | --- | --- | --- | --- | --- |
| | Heat exchanger inlet port | Heat exchanger outlet port | Exhaust gas heat exchanger outlet port | Exhaust gas heat exchanger inlet port | Exhaust gas heat exchanger outlet port |
| Case 1 | 49 | 82 | 156 | 177 | 90 |
| Case 2 | 49 | 82 | 139 | 149 | 90 |
| Case 3 | 49 | 82 | 127 | 135 | 90 |

EXAMPLE 2

The amount of heat required for the reboiler in the case of treating exhaust gas with use of the exhaust gas treatment system including the $CO_2$ recovery unit shown in FIG. 3 was calculated. In calculation, the temperatures of the condensate and the exhaust gas in cases 4 to 6 were each set at the same values as those in the cases 1 to 3 of Table 1. The temperature of the boiler feed water was set as shown in Table 2. The flow rate of the condensate was set at 11.2 ton/hr, the flow rate of the boiler feed water was set at 20.3 ton/hr, and the pressure of the condensate at an inlet port of the exhaust gas heat exchanger was set at 6 atm.

TABLE 2

| | Boiler feed water temperature (° C.) | | |
| --- | --- | --- | --- |
| | Heat exchanger inlet port | Heat exchanger outlet port | Exhaust gas heat exchanger outlet port |
| Case 4 | 41 | 75 | 163 |
| Case 5 | 41 | 75 | 137 |
| Case 6 | 41 | 75 | 125 |

COMPARATIVE EXAMPLE 1

Figure 4:
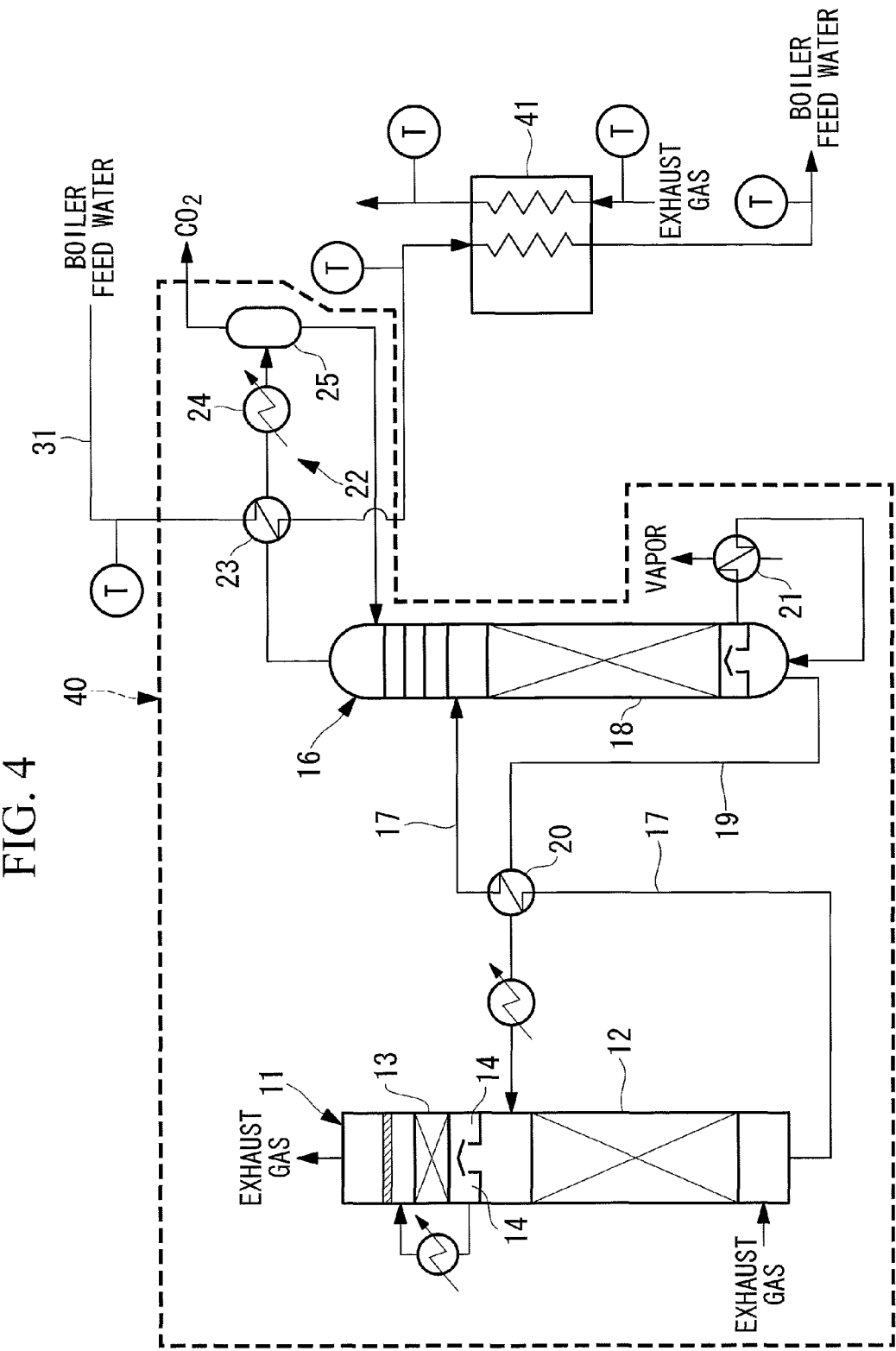
FIG. 4 is a schematic view for explaining a $CO_2$ recovery unit in an exhaust gas treatment system of Comparative Example 1.

The amount of heat required for the reboiler in the case of treating exhaust gas with use of the exhaust gas treatment system including the $CO_2$ recovery unit shown in FIG. 4 was calculated.

In FIG. 4, structure components identical to those in FIGS. 2 and 3 are designated by identical reference signs. In a $CO_2$ recovery unit 40 in FIG. 4, the boiler feed water pipeline 31 is placed so that the cooled boiler feed water circulates to the boiler via the heat exchanger 23 of the $CO_2$ separation section 22 and an exhaust gas heat exchanger 41. However, the $CO_2$ recovery unit 40 in FIG. 4 is not structured to supply condensate from the $CO_2$ absorption column 11 to the absorbing solution regeneration column 16.

In calculation, the temperature of the exhaust gas was set at the same value as that in the case 1 of Table 1, and the temperature of the boiler feed water was set at the same value as that in the case 4 of Table 2.

Table 3 shows ratios of heat amounts required for the reboiler in the cases 1 to 3 of Example 1 with reference to the calculation results of Comparative Example.

TABLE 3

|  | Case 1 | Case 2 | Case 3 |
|---|---|---|---|
| Ratio of required heat amount | 0.80 | 0.87 | 0.90 |

According to Table 3, the heat from the exhaust gas was put into the $CO_2$ recovery unit in the cases 1 to 3, so that heat amounts required for the reboiler were lower than Comparative Example even in the case where the exhaust gas temperature was equal to or lower than that in Comparative Example. In short, it was indicated that the exhaust gas treatment system including the $CO_2$ recovery unit of FIG. 2 had the thermal efficiency higher than that of the system including the $CO_2$ recovery unit of Comparative Example.

Table 4 shows ratios of heat amounts required for the reboiler with reference to the calculation results of Comparative Example and enthalpy ratios of boiler feed water at the outlet port of the exhaust gas heat exchanger to boiler feed water at the inlet port of the second heat exchanger in the cases 4 to 6 of Example 2.

TABLE 4

|  | Case 4 | Case 5 | Case 6 |
|---|---|---|---|
| Ratio of required heat amount | 0.93 | 0.96 | 0.98 |
| Enthalpy ratio | 4.0 | 3.4 | 3.1 |

As shown in Table 4, the heat of exhaust gas is recovered and is used to heat the condensate in the exhaust gas treatment system including the $CO_2$ recovery unit of FIG. 3, so that the thermal efficiency is enhanced compared with the system including the $CO_2$ recovery unit of Comparative Example.

In all the cases 4 to 6, a high enthalpy ratio was obtained. This indicates that the exhaust gas treatment system including the $CO_2$ recovery unit of FIG. 3 can recover heat from exhaust gas with high efficiency in the exhaust gas heat exchanger. When the vapor generated in the boiler is used for power generation, it can be said that higher exhaust gas temperature provides more recovery heat from the exhaust gas and higher power generation efficiency.

REFERENCE SIGNS LIST

1 Exhaust gas treatment system
2 Boiler
3 NOx removal unit
4 Air heater
5, 34 Exhaust gas heat exchanger
6 Dry electrostatic precipitator
7 Wet desulfurization unit
8 Smokestack
10, 30 $CO_2$ recovery unit
11 $CO_2$ absorption column
12 $CO_2$ recovery section
13 Water washing section
14 Tray
15 Condensate supply pipeline
16 Absorbing solution regeneration column
17 Rich solution supply line
18 Regenerating section
19 Lean solution supply line
20 Rich/lean solution heat exchanger
21 Reboiler
22, 32 $CO_2$ separation section
23 Heat exchanger (first heat exchanger)
24 Condenser
25 Separation drum
31 Boiler feed water pipeline
33 Heat exchanger (second heat exchanger)

The invention claimed is:

1. An exhaust gas treatment system provided on a downstream side of a boiler which combusts fuel to heat water and generate water vapor, comprising:
    a $CO_2$ recovery unit including:
        a $CO_2$ absorption column for bringing gas containing $CO_2$ generated in the boiler into contact with a $CO_2$ absorbing solution so that the $CO_2$ absorbing solution absorbs the $CO_2$ and thereby the $CO_2$ is removed out of the gas;
        an absorbing solution regeneration column for separating the $CO_2$ from the $CO_2$ absorbing solution which absorbed the $CO_2$ to regenerate the $CO_2$ absorbing solution;
        a condensate supply pipeline for supplying condensate, which contains the $CO_2$ absorbing solution discharged from the $CO_2$ absorption column, to a bottom portion of the absorbing solution regeneration column; and
        a $CO_2$ separation section placed on a gas downstream side of the absorbing solution regeneration column for performing heat exchange, via a first heat exchanger, between the condensate which circulates in the condensate supply pipeline and a mixture of water vapor and $CO_2$ discharged from the absorbing solution regeneration column so that the $CO_2$ and the water vapor are cooled and separated; and
    an exhaust gas heat exchanger provided on a gas upstream side of the $CO_2$ recovery unit for performing heat exchange between the gas before flowing into the $CO_2$ recovery unit and the condensate so that the condensate is heated while the gas is cooled.

2. The exhaust gas treatment system according to claim 1, comprising
    a boiler feed water pipeline for circulating boiler feed water to the boiler, wherein
    the exhaust gas heat exchanger performs heat exchange between the boiler feed water circulating in the boiler feed water pipeline and the gas so that the boiler feed water is heated.

3. The exhaust gas treatment system according to claim 2, wherein
    the $CO_2$ separation section further includes a second heat exchanger for performing heat exchange between the boiler feed water and the $CO_2$ discharged from the absorbing solution regeneration column, so that the water vapor circulating in the boiler feed water pipeline is heated.

* * * * *